(12) United States Patent
Sharpe et al.

(10) Patent No.: US 12,524,542 B2
(45) Date of Patent: Jan. 13, 2026

(54) REDUCED STORAGE OF SEQUENCE MINING DATA

(71) Applicant: Capital One Services, LLC, McLean, VA (US)

(72) Inventors: Samuel Sharpe, Cambridge, MA (US); Christopher Bayan Bruss, Washington, DC (US); Maximo Moyer, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 294 days.

(21) Appl. No.: 18/166,438

(22) Filed: Feb. 8, 2023

(65) Prior Publication Data

US 2024/0265104 A1    Aug. 8, 2024

(51) Int. Cl.
*G06F 21/56*   (2013.01)
*G06N 3/08*    (2023.01)

(52) U.S. Cl.
CPC ............. *G06F 21/566* (2013.01); *G06N 3/08* (2013.01); *G06F 2221/034* (2013.01)

(58) Field of Classification Search
None
See application file for complete search history.

(56) References Cited

U.S. PATENT DOCUMENTS

| | | | |
|---|---|---|---|
| 2019/0156160 A1* | 5/2019 | Slipenchuk | G06N 5/01 |
| 2021/0042656 A1* | 2/2021 | Watson | G06N 3/084 |
| 2022/0300807 A1* | 9/2022 | Spagnoli | G16C 20/20 |
| 2023/0153284 A1* | 5/2023 | Walters | G06F 16/24578 707/741 |
| 2024/0256955 A1* | 8/2024 | Goodsitt | G06N 5/01 |

\* cited by examiner

*Primary Examiner* — Syed A Roni
(74) *Attorney, Agent, or Firm* — Foley & Lardner LLP

(57) ABSTRACT

A method and related system operations include obtaining a time-ordered set of action types and generating a first dataset by determining, for each respective stored sequence of a plurality of stored sequences, a respective dataset element indicating that the respective stored sequence is present in the time-ordered set of action types. The method may also include generating a reduced dataset based on the first dataset by detecting that the first dataset indicates that a first sequence and a second sequence are present in the time-ordered set of action types, determining a reduced dataset element based on the detection of a presence of the first sequence and the second sequence in the time-ordered set of action types and a score between the first sequence and the second sequence indicated by a table, and detecting malicious activity using a decision model based on the reduced dataset.

19 Claims, 3 Drawing Sheets

REDUCED STORAGE OF SEQUENCE MINING DATA

SUMMARY

Malicious activity, such as data breaches, hacking attempts, or other fraudulent activity, is constantly evolving in definition and scope. The vast quantity of database transaction data or other types of data is an important resource for the development and refinement of malicious activity detection operations. However, this vast quantity of data also may serve as a hindrance to meaningful analysis, as the size of the data itself can prevent meaningful analysis over a useful response time, and naive attempts to reduce such data may be severely hampered by data interpretability issues that may be crucial for downstream decision-making or the meaningful updates of existing decision models.

Some embodiments may store such data systems by obtaining a time-ordered record that includes a set of action types representing actions performed by a user, where the action types are ordered by their corresponding timestamps. Some embodiments may then generate a sequence presence vector based on a set of pre-determined stored action type sequences. For example, some embodiments may determine, for each respective stored sequence of the set of pre-determined stored action type sequences, a respective vector element indicating whether the respective stored sequence matches with the respective stored sequence in the time-ordered record. Some embodiments may then generate a reduced vector based on the sequence presence vector and a sequence relations table (e.g., a correlation table, a table of conditional probability values, a table of other types of likelihood values, etc.). By generating the reduced dataset in a way that can be mapped to known sequences, embodiments may maintain the explainability of generated structured datasets.

Some embodiments may detect a sequence relations score between the first and second sequences indicated by the sequence relations table and determine that a first and second element are related based on the sequence relations score satisfying a first threshold. Some embodiments may then detect that the sequence presence vector indicates that the first and second sequences are present in the time-ordered record and, in response to the detection and the satisfaction of the first threshold, some embodiments may determine a reduced vector element of the reduced vector to indicate a presence of at least one of the first sequence or the second sequence based on the detection of a presence of the first sequence and the second sequence in the time-ordered record. Some embodiments may provide the reduced vector to a neural network model to obtain a set of model results that indicates malicious activity. By detecting malicious activity based on explainable datasets that correspond with known sequences or groups of known sequences, some embodiments may reduce the risk of inaccuracies or mispredictions associated with direct latent space transformations.

Various other aspects, features, and advantages will be apparent through the detailed description of this disclosure and the drawings attached hereto. It is also to be understood that both the foregoing general description and the following detailed description are examples, and not restrictive of the scope of the invention.

BRIEF DESCRIPTION OF THE DRAWINGS

Detailed descriptions of implementations of the present technology will be described and explained through the use of the accompanying drawings.

Figure 1:
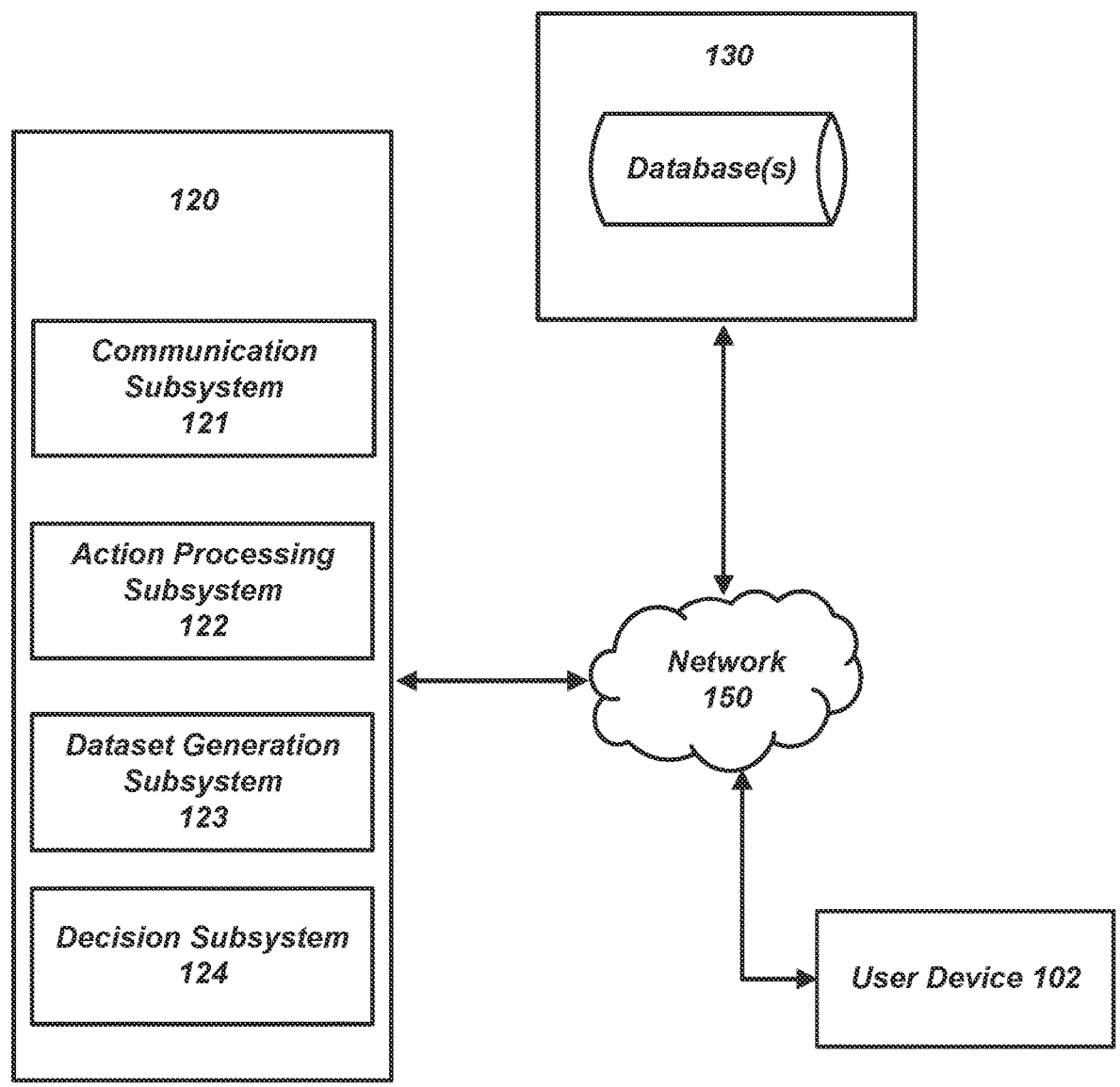
FIG. 1 illustrates a portion of an example system that detects malicious activity, in accordance with some embodiments.

The technologies described herein will become more apparent to those skilled in the art by studying the detailed description in conjunction with the drawings. Embodiments of implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

FIG. 1 is a block diagram illustrating a portion of an example system 100 that detects malicious activity, in accordance with some embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 121-124. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an Application Programming Interface (API) of a third-party service via the network 150 to perform a machine learning model training operation or another type of decision model training operation, obtain model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as data associated with user actions, action types, timestamps for the user actions, user identifiers, other records that store information associated with users, machine learning model parameters, machine learning model outputs, etc. For example, data objects of the set of databases 130 may include action histories performed by a set of users, a set of action type categories used to categorize the user actions, and time-ordered datasets of action types that are sorted based on timestamps stored in the action histories.

In some embodiments, the communication subsystem 121 may retrieve user actions, historical information, or other information indicative of user actions. The communication subsystem 121 may obtain other types of information used to perform one or more operations described in this disclosure, such as user-identifying information. For example, after obtaining instructions to perform a set of actions from a user accessing the client computing device 102, some embodiments may use the communication subsystem 121 to retrieve additional user information associated with the user from the set of databases 130. The communication subsystem 121 may also send information to client devices, such as the client computing device 102, to the set of databases 130, or to another destination. For example, the communication subsystem 121 may send received actions and their corresponding timestamps to the set of databases 130. The communication subsystem 121 may further send instructions to perform responsive actions based on one or more outputs of a decision subsystem 124, which is described elsewhere in this disclosure.

In some embodiments, an action processing subsystem 122 may perform operations to determine a time-ordered set of action types based on the user actions. After obtaining a set of actions via the communication subsystem 121, an action processing subsystem 122 may classify each action of the set of actions into a particular action type by selecting a corresponding action type of a plurality of action types for each action of the set of actions. For example, an action processing subsystem 122 may store a plurality of definitions for a plurality of action types. An action type may represent one type of action or multiple types of actions, and may relate to actions taking with respect to a computing environment, modifying values in an account, communicating over a communication platform, etc. For example, some action types may indicate actions taken in a computing environment, such as "amount of data read over a particular threshold," "amount of data written over a particular threshold," "nodes accessed," etc. Alternatively, or additionally, some action types may indicate a change in the values of a user-related account, such as a particular amount of a transfer in values between accounts, a category associated with the change in the amount (e.g., "electronics"), a withdrawal from an account over a particular amount, etc. In some embodiments, an action type may be represented by one or more characters or symbols. For example, a first action type may include the character sequence "Aqz.35" to represent an action type indicating that a user has accessed an account and reduced a value of the account by 35 units, and a second action type may include the character "T" to represent a data transfer to a third-party data source.

In some embodiments, the action processing subsystem 122 obtains a set of actions and a set of stored action types and processes each action by retrieving a first action identifier and one or more action parameters for the first action in the set of actions. The action processing subsystem 122 may retrieve actions based on the corresponding timestamps of those actions and may match different action types from the set of stored action types with a corresponding set of actions to generate the time-ordered set of action types, where the order is determined by the timestamps. In some embodiments, the action processing subsystem 122 may also detect parameters from the actions and further associate the parameters with the action types at their respective timestamps in a time-ordered dataset. Some embodiments may perform other operations to process actions or their corresponding sequences similar to that of the subsystems described in co-pending application Ser. No. 18/166,432, titled "Generating User Group Definitions," filed on 8 Feb. 2023, the entirety of which is incorporated herein.

In some embodiments, a dataset generation subsystem 123 may generate a reduced dataset based on a time-ordered set of action types. Some embodiments may generate the reduced dataset based on a time-ordered set of action types by first determining a sequence presence dataset based on the time-ordered set of action types and then determining the reduced dataset based on the sequence presence dataset. A second dataset generated based on a first dataset may a reduced dataset if the second dataset has a lesser size (e.g., size with respect to memory, size with respect to element count, etc.) when compared to a size of the first dataset. For example, some embodiments may determine an initial vector as a sequence presence dataset, the initial vector having 200 elements. Some embodiments may then generate, as a reduced dataset, a reduced vector having 25 elements, though some embodiments may generate a reduced vector having some other number of elements less than 200 elements, such as 100 elements, 50 elements, 10 elements, etc. Some embodiments may generate a reduced dataset that is reduced in size by at least 50% or at least 25% with respect to an associated sequence presence dataset, where the reduction may be with respect to a count of elements allocated to the dataset or a memory storage of the sequence presence dataset.

The dataset generation subsystem 123 may generate a sequence presence dataset based on a time-ordered set of action types by detecting a match between a sequence of action types in the time-ordered set of action types and a stored sequence of a plurality of stored sequences. If a match is detected, some embodiments may update a sequence presence vector or some other type of sequence presence dataset (e.g., a data object having different properties such that the value of each respective property represents a presence or a count of a respective sequence in a time-ordered set of action types). Each element of the sequence presence vector may represent the presence of a corresponding sequence in a time-ordered set of action types, where the sequence presence may be treated as a feature type of a time-ordered set of action types, and where feature types may be used as inputs for a prediction model or a decision model. Because specific sequences often predict specific types of malicious activity, such sequences may serve as efficient indicators of malicious activity in an explainable manner.

Some embodiments may retrieve a set of stored sequences from a pre-determined destination without updating the set of stored sequences. Alternatively, some embodiments may add a stored sequence to the set of stored sequences by detecting the stored sequence in a plurality of time-ordered sets of action types of the training set. For example, some embodiments may detect a candidate sequence in a subset of time-ordered sets of action types and determine that a count of the subset satisfies a threshold. In response to a determination that the count of the subset satisfies the threshold, some embodiments may add the candidate sequence to a plurality of stored sequences. Furthermore, some embodiments may perform other operations to determine stored sequences using operations described in co-pending application Ser. No. 18/166,432, titled "Generating User Group Definitions," filed on 8 Feb. 2023.

In some embodiments, the dataset generation subsystem 123 may generate a reduced dataset based on a sequence presence dataset. Some embodiments may, when determining a reduced dataset, use a table indicating the relations between different sequences ("sequence relations table"). The sequence relations table may indicate relations between different sequences or other feature types of a time-ordered set of action types. In some embodiments, one or more elements of a reduced dataset may correspond with features representing groupings of one or more sequences. For example, the dataset generation subsystem 123 may detect that a sequence presence vector includes a first element indicating the presence of a first sequence, includes a second element indicating the presence of a second sequence, and includes a third element indicating the presence of a third sequence. The dataset generation subsystem 123 may determine, based on the sequence relations table, that the first sequence and the second sequence are related and update only one element of the reduced dataset instead of updating two elements of the reduced dataset. Furthermore, the dataset generation subsystem 123 may determine, based on the sequence relations table, that the third sequence is part of a grouping of related sequences and update a second element of the reduced dataset, where the second element may represent a grouping of sequences that includes the first sequence.

Some embodiments may generate the sequence relations table using multiple sequence presence datasets corresponding with different time-ordered sets of action types. A sequence relations table may include various types of datasets that indicate a likelihood of similarity or relation between two different sequences. In some embodiments, the sequence relations table may be represented by a correlation table indicating the correlation between two different sequences with respect to their mutual presence in a time-ordered set of action types. For example, some embodiments may obtain 1,000 different sequence presence vectors, each vector having 10 different elements representing 10 different sequences, where the 1,000 different sequence presence vectors correspond with 1,000 different time-ordered sets of action types. Some embodiments may then determine the correlation between pairings of each of the 10 different elements to determine a correlation table. Alternatively, or additionally, the sequence relations table may indicate the probability for the presence of a first sequence in a time-ordered set of action types when a second sequence is present in the time-ordered set of action types. For example, some embodiments may obtain 1,000 different sequence presence vectors, each vector having 10 different elements representing 10 different sequences, where the 1,000 different sequence presence vectors correspond with 1,000 different time-ordered sets of action types. Some embodiments may then determine the correlation between pairings of each of the 10 different elements to determine a correlation table. Alternatively, or additionally, the time-ordered set of action types may indicate one or more user-provided groupings of related sequences.

Alternatively, some embodiments may generate a reduced dataset using other data reduction methods. For example, some embodiments may use principal component analysis (PCA) to determine a set of principal components of a sequence presence vector. Alternatively, or additionally, some embodiments may provide a sequence presence vector to an encoder neural network to determine an encoded vector in a latent space of the encoder neural network. Some embodiments may then provide a reduced dataset generated from these data reduction methods to a decision model to detect malicious activity.

A decision subsystem 124 may detect malicious activity based on the dataset(s) generated using the dataset generation subsystem 123. For example, the decision subsystem 124 may provide the reduced dataset to a transformer neural network to determine a set of model results predicting the occurrence or non-occurrence of malicious activity. For example, the decision subsystem 124 may provide a reduced sequence presence vector to a transformer neural network that outputs a prediction score and compare the prediction score to a malicious activity threshold. In response to a determination that the score satisfies the malicious activity threshold, the decision subsystem 124 may update a value of a user-related record to label the user as being associated with malicious activity or otherwise indicate the likelihood of malicious activity. Furthermore, in some embodiments, the decision subsystem 124 may take responsive action based on the model results. For example, the decision subsystem 124 may detect that a decision model result satisfies a malicious activity threshold and, in response, lock a user account of the user to prevent further access to the account. Alternatively, or additionally, some embodiments may attempt to reverse an action, notify a user message destination stored in association with the user, etc.

Figure 2:
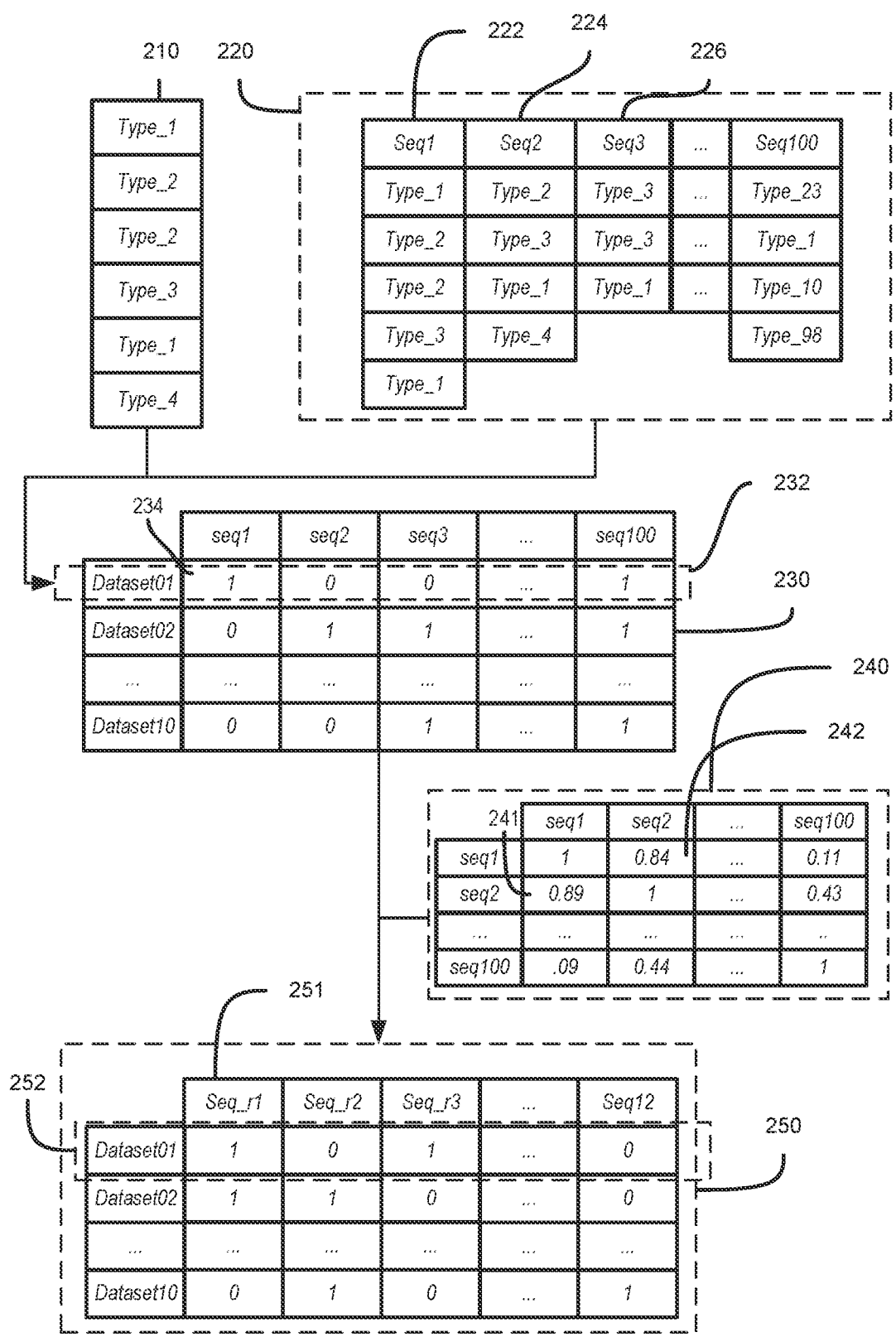
FIG. 2 illustrates data structures representing a time-ordered sequence of action types, sequence presence datasets, and a reduced dataset in accordance with some embodiments.

FIG. 2 illustrates data structures representing a time-ordered sequence of action types, sequence presence datasets, and a reduced dataset in accordance with some embodiments. A data structure 210 may include a column indicating an ordered set of action types representing different actions taken by a user or affecting a user. Though not shown, other information may be added to data structure 210 (e.g., timestamps or other parameters). The action types may be time-ordered based on timestamps, for example, in chronological or reverse chronological order. Some embodiments may analyze the data structure 210 based on a data structure 220, where the data structure 220 represents a plurality of stored sequences, and where the columns 222, 224, and 226 each represent different stored action type sequences. Based on a detection that the sequence "seq1" shown in the column 222 is present in the data structure 210, some embodiments may update element 234 of the sequence presence dataset 232 to be equal to "1" to indicate that the sequence "seq1" is present in the data structure 210. Similarly, some embodiments may update other respective elements of the sequence presence dataset 232 to indicate the presence or lack of their respective sequences. Some embodiments may perform this operation to result in the collection of sequence presence datasets 230.

Some embodiments may then use a sequence relations table 240 to transform the collection of sequence presence datasets 230 into a corresponding collection of reduced datasets 250. Some embodiments may generate the reduced dataset 252 by updating the elements of the reduced dataset 252 based on whether corresponding elements of the sequence relations table 240 indicate a relation or grouping with other sequences. For example, the column 251 may represent a reduced sequence feature "Seq_r1," which indicates the presence of related sequences "seq1," "seq2," and other sequences based on their elements in the sequence relations table 240 indicating a likelihood of relations greater than a relationship threshold equal to "0.7." The relation of "seq1" and "seq2" may be determined based on a determination that an element 241 of the sequence relations table 240 is greater than the relationship threshold "0.7." The element 241 may represent a probability that the sequence "seq2" is present in the data structure 210 based on the presence of the sequence "seq1" in the data structure 210. Alternatively, the relation of "seq1" and "seq2" may be determined based on the element 241 being greater than the relationship threshold and based on an element 242 of the sequence relations table 240 being greater than the relationship threshold. In some embodiments, the element 242 may represent a probability that the sequence "seq1" is present in the data structure 210 based on the presence of the sequence "seq2" in the data structure 210.

Some embodiments may then provide each dataset of the reduced datasets 250 to a decision model to determine a set of model outputs used to predict malicious activity. For example, some embodiments may provide reduced dataset 252 to a trained neural network to generate a set of model results that indicate malicious activity. In response, some embodiments may then prevent further actions from being taken based on instructions provided by a user identified as performing the actions indicated by the data structure 210.

Figure 3:
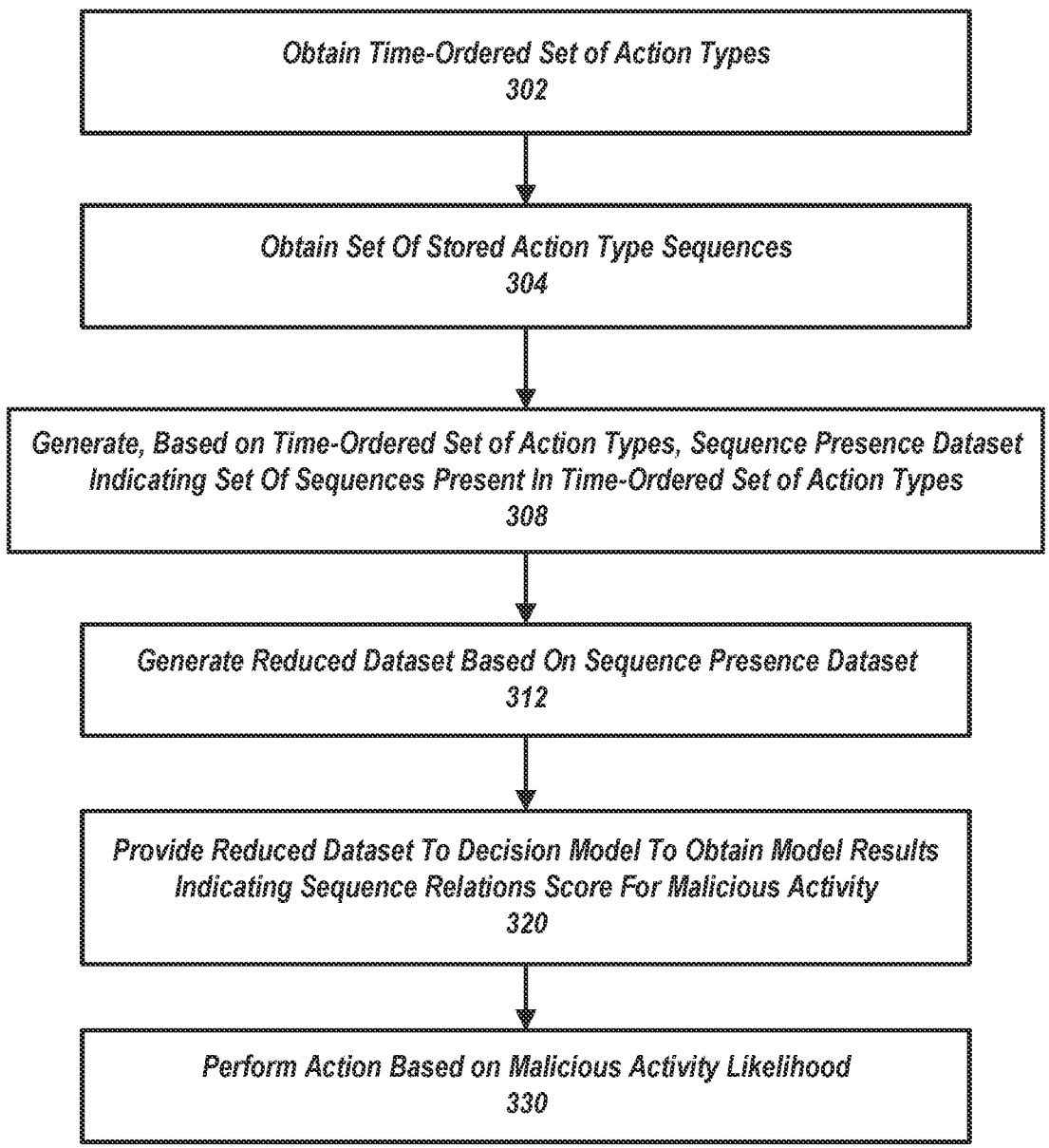
FIG. 3 is a flowchart of operations for an exemplary method to store a reduced dataset usable for malicious activity detection, in accordance with one or more embodiments.

FIG. 3 is a flowchart of operations for an exemplary method 300 to store a reduced dataset usable for malicious activity detection, in accordance with one or more embodiments. Some embodiments may obtain a time-ordered set of action types, as indicated by block 302. The time-ordered set of action types may be stored or obtained in various forms. For example, some embodiments may obtain a time-ordered record that includes multiple action types stored in conjunction with a corresponding set of timestamps indicating when an action of the action type has been performed. The time-ordered record may further include additional parameters associated with the action type, such as an amount that is being transferred, a duration of a chat interaction, a duration of a data session, etc. In addition, the time-ordered record or another set of time-ordered action types may be associated with corresponding metadata, such as a geographic location indicating where a client device was attempting to initiate a transaction or access data. Furthermore, as used in this disclosure, a record may include a data structure representing collection of feature values for a corresponding set of features. For example, a record may include a row of a database management system (DBMS) system, such as a row of a Structured Query Language (SQL) database. Alternatively, or additionally, a record may include a data object, where different members of the data object may represent different values. Various other data structures may be used as records, where values of the record may be distributed across different locations in virtual or physical memory.

Some embodiments may obtain the time-ordered set of action types in real time during an interaction with a user. For example, a user may initiate a data session to perform a sequence of operations, where each operation or combination of operations may form a sequence of actions that are categorized into action types. Some embodiments may then perform operations to provide the sequence of operations as a time-ordered record to be processed in accordance with one or more operations described by the exemplary method 300. As described elsewhere in this disclosure, some embodiments may respond to one or more user actions in real time, such as by preventing a transaction, flagging an attempted access, etc.

Some embodiments may determine that a transaction history represented by a time-ordered set of action types is too long and, in response, truncate the time-ordered set of action types based on a cutoff threshold to form a truncated time-ordered set of action types. The cutoff threshold may include a cutoff duration or a cutoff length. A cutoff duration may indicate a cutoff time such that all actions occurring before the cutoff time are not included in the time-ordered set of action types. A cutoff length may indicate a maximum permitted length of the time-ordered set of action types, such as permitting an array of up to 5 action types, up to 10 action types, up to 100 action types, up to 10,000 action types, or up to some other number of action types. Some embodiments may perform other operations described for the exemplary method 300 or other operations described in this disclosure on the truncated time-ordered set of action types.

Some embodiments may obtain a set of stored action type sequences, as indicated by block 304. As described elsewhere in this disclosure, some embodiments may obtain a set of stored action type sequences usable for identifying one or more detected sequences in a time-ordered set of action types. The set of stored action type sequences may be specific to a domain, where different domains may correspond with different sets of stored action type sequences. For example, a first set of stored action type sequences may correspond with the domain category "spiders" and include 457 action type sequences, while a second set of stored action type sequences may correspond with the domain category "pencils" and include 234 action type sequences, where the two domains may share one or more sequences while also having one or more different sequences. Alternatively, the set of stored action type sequences of the first domain may include none of the set of stored action type sequences of the second domain.

In some embodiments, the set of stored action type sequences may include sequences of sequences. For example, a first sequence may be represented by "seq1," which may be defined as "[action1, action2, action4]," and a second sequence may be represented by "seq2," which may be defined as "[action4, action2]." Some embodiments may then store an order of sequences "[seq1, seq2]" in the set of stored action type sequences. Alternatively, or additionally, some embodiments may store an order of sequences "[[action1, action2, action4], [action4, action2]]" in the set of stored action type sequences. Furthermore, some embodiments may include multiple sequences in an order of sequences. For example, some embodiments may include an order of sequences "[seq2, seq1, seq3]," where each element in this order of sequences represents a different sequence of action types.

Some embodiments may generate one or more sequences for a set of stored action type sequences by detecting a similarity of features. For example, some embodiments may obtain a plurality of time-ordered sets of action types that include first and second time-ordered sets of action types. Some embodiments may then detect a new sequence of action types that is shared between the first and second time-ordered sets of action types. For example, some embodiments may obtain a first set of action types that includes the sequence "[action01, action05, action94, action44]" and obtain a second set of action types that includes the sequence "[action01, action94, action44, action23]." Some embodiments may then perform a matching algorithm to detect the shared action type sequence "[action94, action44]." Some embodiments may add one or more shared action type sequences detected from multiple time-ordered sets of action types to the set of stored action type sequences.

Furthermore, some embodiments may detect a shared order of shared action type sequences and add the detected shared order of shared action type sequences to the set of stored action type sequences. For example, some embodiments may obtain a plurality of time-ordered sets of action types that include first and second time-ordered sets of action types. Some embodiments may then detect a new sequence of action types that is shared between the first and second time-ordered sets of action types. For example, some embodiments may obtain a first set of action types that includes the sequence "[action01, action05, action05, action94, action44, action672, action21]" and obtain a second set of action types that includes the sequence "[action94, action44, action23, action672, action21]." Some embodiments may then detect that both the first and second time-ordered sets of action types include the first sequence "[action94, action44]" and the second sequence "[action672, action21]." Some embodiments may then add a sequence of the first and second sequences to the time-ordered set of action types. As described elsewhere, some embodiments may then detect a match with this sequence of the first and second sequences and a segment of an additional time-ordered set of action types based on a determination that the segment starts with the first sequence and ends with the second sequence, even if one or more additional action types are performed between first and second sequences.

Before adding a shared action type sequence or a shared order of shared action type sequences to the set of stored action type sequences, some embodiments may require that the shared action type sequence or the shared order of shared action type sequences is shared among a threshold number of time-ordered sets of action types of a training set. In some embodiments, the threshold number may be a pre-set value such as 1, 5, 10, or some other integer greater than zero. Alternatively, the threshold number may be a percentage of the size of the training set with respect to a count of the time-ordered sets of action types in the training set, where the percentage may be set to 1%, 5%, 10%, 25%, 50%, or some other value less than 100%.

Some embodiments may generate, based on the time-ordered set of action types, a sequence presence dataset indicating a set of sequences present in the time-ordered set of action types, as indicated by block 308. The sequence presence dataset may be represented as a sequence presence vector, where a sequence presence vector may be a vector indicating the presence of one or more sequences or orders of sequences. For example, the sequence presence vector for a time-ordered record may include a first element representing the presence or non-presence of a first action type sequence in the time-ordered record, where the first element may be set to "0" if the first action type sequence is not present in the time-ordered record, and where the first element may be set to "1" if the first action type sequence is present in the time-ordered record.

In some embodiments, each sequence listed in a set of stored action type sequences may be associated with a corresponding feature of the sequence presence dataset. For example, some embodiments may obtain a set of stored action type sequences containing nine different sequences and populate nine elements of a sequence presence vector, where each respective vector element of the sequence presence vector corresponds with a sequence of the set of stored action type sequences. For example, if a first action type sequence may be represented as "[A, B, D]," where each corresponding letter represents a different action type, and if an obtained set of time-ordered action types can be represented by the sequence "[A, B, D, A, C, C, A, B, D]," some embodiments may detect the first action type sequence in the set of time-ordered action types. Some embodiments may then update a first element of a sequence presence vector from an initial value "0" to an updated value "1." Some embodiments may then repeat this same process for each other action type sequence in the obtained set of action type sequences to populate the other elements of the sequence presence vector.

In some embodiments, instead of simply indicating the presence of a sequence in a time-ordered set of action types, some embodiments may count the number of instances of the sequence and update an element of the corresponding sequence presence vector to include the count. For example, some embodiments may determine that a time-ordered record includes five distinct instances of a first sequence and, in response, may update an element of a sequence presence vector to be equal to "5." Furthermore, when counting, some embodiments may require that either a maximum or minimum amount of time has passed between occurrences recorded by event sequences. For example, some embodiments may detect that a first portion of a time-ordered record matches with a first sequence of an obtained set of stored sequences. Some embodiments may first increment the corresponding element of a sequence presence vector to be equal to "1." Some embodiments may then detect that a second portion of the time-ordered record also matches with the first sequence and, in response, determine whether a duration between the occurrence of the first and second portions satisfies a set of duration thresholds. Some embodiments may require that satisfying the set of duration thresholds includes that a minimum time has elapsed between the first and second portions. Alternatively, or additionally, some embodiments may require that satisfying the duration threshold includes that a maximum amount of time has not elapsed between the first and second portions.

Some embodiments may generate features based on a specific order of detected sequences (i.e., a sequence of sequences). For example, some embodiments may obtain a set of stored action type sequences indicating a specified pattern of sequences that indicates a first sequence before a second sequence. Some embodiments may then obtain a first time-ordered record and detect that the order of a first instance of the first sequence and a first instance of the second sequence as they are present in the time-ordered record matches the sequence order indicated by the specified pattern of sequences. In response, some embodiments may update a sequence presence dataset corresponding with the time-ordered record by switching an element of the sequence presence dataset to indicate that the specified pattern of sequences was detected in the time-ordered record.

Furthermore, some embodiments may obtain a set of stored action type sequences indicating that different orders of sequences correspond with different elements of a representational sequence presence dataset for a time-ordered record. For example, some embodiments may detect a second instance of the first sequence after the first instance of the second sequence and detect a second instance of the second sequence after the second instance of the first sequence. Some embodiments may determine that this order of instances of sequences matches with a second specified pattern of detected sequences and, in response, update a different element of the sequence presence dataset to indicate that the second specified pattern of sequences was detected in the time-ordered record. By permitting some embodiments to account for different orders of different features, some embodiments may capture the different meanings or intents indicated by different orders of the same set of actions.

Some embodiments may filter out false positives by noting that certain user types are associated with certain sequences that are not indicative of malicious activity for that specific user type. Some embodiments may obtain a set of permitted sequences based on one or more user attributes associated with a user, where a user attribute may be a label assigned to an account of the user or demographic information associated with the user. For example, a user attribute may include a geographic region of the user, an account type of the user, a label assigned to the user based on the user's average number of transactions, or a sum of the transaction amounts within a defined period, etc. The set of permitted sequences may include one or more sequences indicated as normal for a user type of the user and which should not be considered indicative of malicious activity even if such a sequence would be indicative of malicious activity for other users not of that user type. Some embodiments may then set a first value of the sequence presence dataset to indicate that the sequence is not detected in response to detecting that a user is of the user type and that the set of permitted sequences includes this permitted sequence. For example, some embodiments may determine that a user is of a first user type and obtain a first set of permitted sequences. Some embodiments may then determine that a sequence presence vector of the user indicates that a first sequence is present in a time-ordered set of action types performed by the user. In response to a detection that the user that performed the actions of a time-ordered set of action types is of the first user type and that the first sequence is a permitted sequence of the first set of permitted sequences, some embodiments may set the corresponding element indicating the presence of the first vector to be equal to zero. By pre-filtering datasets in this manner, some embodiments may reduce the need for different decision models or prevent the need to reconfigure a decision model based on a user type.

Some embodiments may generate a reduced dataset based on the sequence presence dataset, as indicated by block 312. Some embodiments may generate a reduced vector based on the sequence presence vector, where the reduced vector has fewer elements than the sequence presence vector. By storing a reduced dataset instead of a full dataset, some embodiments may reduce the data storage cost and increase the robustness of downstream analysis. Some embodiments may generate a reduced dataset using a sequence relations table, where the sequence relations table may relate different sequences with each other. For example, a sequence relations table may relate a first sequence "[x1, x2, x3, x5]" with a second sequence "[x1, x2, x4, x5]," and some embodiments may use this sequence relations table to determine that both the first and second sequences are present in a set of time-ordered action types. Some embodiments may then increment a value of a reduced dataset element by one, where the reduced dataset element represents an indication of the presence of any sequence of a set of related sequences that includes the first and second sequences. Alternatively, some embodiments may increment a value of a reduced dataset element by two, where the value of the reduced dataset element represents a count of related sequences that include the first and second sequences.

In some embodiments, a sequence relations table may be generated based on a determination that two different sequences are correlated with each other across multiple datasets. For example, some embodiments may generate a sequence relations table based on 1,000 time-ordered sets of action types. For each set of action types of the 1,000 time-ordered sets of action types, some embodiments may generate a sequence presence dataset (e.g., a sequence presence vector or other set of indicators of sequence presence) indicating the presence or absence of different sequences. Some embodiments may then generate a sequence relations table based on this plurality of sequence presence datasets to determine a set of sequence relations scores of different sequences, where a sequence relations score may include a probability value, a correlation value, or some other indicator of a relation between two sequences. For example, some embodiments may determine that a first sequence is present in a first number of datasets and that a second sequence is present in a second number of these same datasets while the second sequence is also present in a third number of additional datasets where the first sequence is not present. In response, some embodiments may populate the sequence relations table based on the first, second, and third numbers to determine a sequence relations score between the first and second sequences. In some embodiments, a sequence relations score may be such that the sequence relations scores of the first and second sequences are the same with respect to each other. For example, the sequence relations scores between two sequences may be a correlation value. Alternatively, a sequence relations score may be a conditional probability value. For example, a first sequence relations score may be set to the conditional probability of a second sequence being present in a time-ordered set of action types based on the presence of a first sequence in the time-ordered set of action types, and a second sequence relations score may be set to the conditional probability of the first sequence being present in the time-ordered set of action types based on the presence of the second sequence in the time-ordered set of action types.

Some embodiments may use a threshold when determining whether two sequences are correlated or otherwise related to each other with respect to updating a sequence presence dataset. For example, some embodiments may determine that a sequence relations table indicates a first sequence is related to a second sequence based on the corresponding sequence relations score satisfying a threshold. Some embodiments may then update an element of a reduced vector ("reduced vector element") associated with the first and second sequences in response to a detection that an element of a full sequence presence vector indicates that the second sequence is present in a time-ordered set of action types even if the first sequence is not present in the time-ordered set of action types.

By using a sequence relations table of related sequences, some embodiments may maintain the explainability of a reduced vector or other type of reduced dataset. The explainability of a reduced dataset for flagging malicious activity may be useful for various compliance reasons and downstream processing. As described elsewhere, the direct use of a latent space or other abstract methods to group different sequences may force later downstream methods to adapt to the earlier latent space or otherwise accept a reduced accuracy for downstream predictions. By maintaining an explainable but reduced dataset, some embodiments may allow for growth and development of these downstream methods and still avoid the data storage costs of using full datasets.

In many cases, the sequence relations tables of related sequences may be related based on their corresponding vector distances from each other in a semantic latent space. For example, some embodiments may initially convert different action type sequences into a latent space using an encoder neural network and determine a set of reduced action type sequence groups based on one or more clustering algorithms in this latent space together. Some embodiments may then confirm the validity of these grouped action type sequences by comparing words of the corresponding action type sequences with an internal ontological database, providing the grouped action type sequences to a rules engine that provides an output confirming whether the grouped sequences should be grouped together, etc. Alternatively, or additionally, some embodiments may request a confirmation for the grouping of sequences from a user.

Some embodiments may provide a reduced vector or another type of reduced dataset to a decision model to obtain model results indicating a sequence relations score for malicious activity, as indicated by block 320. Some embodiments may use a neural network model as a decision model, where the neural network model may be used to tokenize the reduced dataset into a set of token vectors or predict a neural network model result based on the set of token vectors. For example, some embodiments may use a first neural network to tokenize a reduced dataset into a first set of token vectors and then provide the first set of token vectors to a transformer neural network to determine the set of model results. For example, some embodiments may provide the first set of token vectors to a transformer after the transformer was trained to predict malicious activity with the use of a training set.

Some embodiments may further update a reduced vector or another type of reduced dataset based on a set of weights, provide the set of weights to the decision model in conjunction with the reduced dataset, or otherwise determine model results based on the set of weights. The set of weights may be associated with a category associated with the time-ordered set of action types. Being associated with the time-ordered set of action types may include being associated with a user performing the time-ordered set of action types (e.g., being a set of weights mapped to a user attribute, being a set of weights directly stored in a field of a user record, etc.). Alternatively, a set of weights associated with the time-ordered set of action types may include a set of weights that is directly mapped to the time-ordered set of action types via a reference table. Some embodiments may modify a reduced dataset based on the set of weights. Modifying the reduced dataset based on the set of weights may include various types of modifications. For example, some embodiments may modify a reduced vector or another type of reduced dataset by determining, for each respective vector element of the reduced vector, a product of the respective vector element and a corresponding weight of the set of weights. Alternatively, or additionally, some embodiments may modify a reduced dataset by determining, for each respective element of the reduced dataset, a sum of the respective element of the reduced dataset and a corresponding element of the set of weights. Some embodiments may then provide the modified value to the decision model.

Some embodiments may detect that different accounts of different users do not share the same type and number of sequences of events, but label the accounts with the same group label because of high correlations between their respective sequences. For example, after obtaining a first set of time-ordered set of action types performed by a first user, some embodiments may obtain a second time-ordered set of action types performed by a second user or otherwise associated with the second user. Some embodiments may then perform operations described elsewhere in this disclosure to generate a second sequence presence dataset for the second time-ordered set of action types and generate a second reduced dataset based on the second sequence presence dataset, where the second reduced dataset indicates different features. Some embodiments may then determine a similarity score between the first and second reduced datasets based on a difference between the first and second reduced datasets, where the difference may be a vector difference, a magnitude of the vector difference, etc. Based on a determination that the similarity score satisfies a similarity threshold, some embodiments may label the second user with a same label assigned to the first user, where the label may indicate malicious activity.

Some embodiments may perform one or more responsive actions based on the likelihood of malicious activity, as indicated by block 330. Some embodiments may determine that the likelihood of malicious activity is greater than a malicious activity threshold and perform a set of responsive actions in response. For example, after determining a likelihood of malicious activity based on a reduced dataset determined from actions performed by a user and that the likelihood satisfied a malicious activity threshold, some embodiments may alert the user that malicious activity has been detected by sending the user a message via a designated message destination (e.g., an email address, phone number, etc.). Alternatively, or additionally, some embodiments may prevent additional actions from being performed by the user or may prevent specific types of actions from being performed by the user. For example, some embodiments may prevent a user from accessing specific types of information if the user is indicated to have performed actions indicative of malicious activity based on a satisfaction of a malicious activity threshold.

The operations of each method presented in this disclosure are intended to be illustrative and non-limiting. It is contemplated that the operations or descriptions of FIG. 3 may be used with any other embodiment of this disclosure. In addition, the operations and descriptions described in relation to FIG. 3 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety (i.e., the entire portion), of a given item (e.g., data) unless the context clearly dictates otherwise. Furthermore, a "set" may refer to a singular form or a plural form, such that a "set of items" may refer to one item or a plurality of items.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a set of non-transitory, computer-readable media, such as an electronic storage medium. Furthermore, the use of the term "media" may include a single medium or combination of multiple media, such as a first medium and a second medium. A set of non-transitory, computer-readable media storing instructions may include instructions included on a single medium or instructions distributed across multiple media. The processing devices may include one or more devices configured through hardware, firmware, and/or software to be specifically designed for the execution of one or more of the operations of the methods. For example, it should be noted that one or more of the devices or equipment discussed in relation to FIG. 1 could be used to perform one or more of the operations in FIG. 3.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combination of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), Wi-Fi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent the processing functionality of a plurality of devices operating in coordination. The processors may be programmed to execute computer program instructions to perform functions described herein of subsystems 121-124 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems 121-124 may provide more or less functionality than is described. For example, one or more of subsystems 121-124 may be eliminated, and some or all of its functionality may be provided by other ones of subsystems 121-124. As another example, additional subsystems may be programmed to perform some or all of the functionality attributed herein to one of subsystems 121-124 described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as a user input interface. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding the use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompass all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection has some property should not be read to exclude cases where some otherwise identical or similar members of a larger collection do not have the property (i.e., each does not necessarily mean each and every). Limitations as to the sequence of recited steps should not be read into the claims unless explicitly specified (e.g., with explicit language like "after performing X, performing Y") in contrast to statements that might be improperly argued to imply sequence limitations (e.g., "performing X on items, performing Y on the X'ed items") used for purposes of making claims more readable rather than specifying a sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of an already-generated value.

Unless the context clearly indicates otherwise, ordinal numbers used to denote an item do not define the item's position. For example, an item that may be a first item of a set of items even if the item is not the first item to have been added to the set of items or is otherwise indicated to be listed as the first item of an ordering of the set of items. Thus, for example, if a set of items is sorted in a sequence from "item 1," "item 2," and "item 3," a first item of a set of items may be "item 2" unless otherwise stated.

Enumerated Embodiments

The present techniques will be better understood with reference to the following enumerated embodiments:
1. A method comprising: obtaining a time-ordered set of action types; generating a first dataset by determining, for each respective stored sequence of a plurality of stored sequences, a respective dataset element indicating that the respective stored sequence is present in the time-ordered set of action types, wherein the plurality of stored sequences comprises a first sequence and a second sequence; generating a reduced dataset based on the first dataset by (i) detecting that the first dataset indicates that the first sequence and the second sequence is present in the time-ordered set of action types and (ii) determining a reduced dataset element based on the detection of a presence of the first sequence and the second sequence in the time-ordered set of action types and a sequence relations score between the first sequence and the second sequence indicated by a sequence relations table; and detecting malicious activity using a decision model based on the reduced dataset.
2. A method comprising: obtaining a time-ordered record comprising a set of action types representing actions of a user, wherein the set of action types is ordered based on a corresponding set of timestamps; generating a sequence presence vector based on stored action type sequences by determining, for each respective stored sequence of the stored action type sequences, a respective vector element indicating whether the respective stored sequence is present in the time-ordered record; generating a reduced vector based on the sequence presence vector and a correlation table indicating that a first sequence is correlated with a second sequence, wherein the reduced vector has fewer elements than the sequence presence vector, and wherein generating the reduced vector comprises: detecting that the sequence presence vector indicates that the first sequence and the second sequence is present in the time-ordered record;

and determining a reduced vector element of the reduced vector indicating a presence of at least one of the first sequence or the second sequence based on the detection of a presence of the first sequence and the second sequence in the time-ordered record and a correlation score between the first and second sequences indicated by the correlation table; providing the reduced vector to a neural network model to obtain a set of model results; and detecting malicious activity related to the user based on the set of model results.

3. A method comprising: obtaining a time-ordered record associated with a user, the time-ordered record comprising a set of action types ordered based on a corresponding set of timestamps; generating a first dataset based on a plurality of stored sequences by determining, for each respective stored sequence of the plurality of stored sequences, a respective dataset element indicating that the respective stored sequence is present in the time-ordered record, wherein the plurality of stored sequences comprises a first sequence and a second sequence; generating a reduced dataset based on the first dataset and a sequence relations table by (i) detecting that the first dataset indicates that the first sequence and the second sequence is present in the time-ordered record and (ii) determining a reduced dataset element based on the detection of a presence of the first sequence and the second sequence in the time-ordered record and a sequence relations score between the first and second sequences indicated by the sequence relations table; providing the reduced dataset to a decision model to obtain a set of model results; and detecting malicious activity related to the user based on the set of model results.

4. The method of any of embodiments 1 to 3, wherein generating the reduced vector further comprises associating the first sequence with the second sequence in response to a detection that the correlation score is greater than a correlation threshold.

5. The method of any of embodiments 1 to 4, wherein generating the first dataset comprises: detecting that an instance of a third sequence in the time-ordered record is before an instance of a fourth sequence in the time-ordered record; and updating a second element of the first dataset to indicate that the third sequence is before the fourth sequence.

6. The method of embodiment 5, wherein: the instance of the third sequence is a first instance of the third sequence; the instance of the fourth sequence is a first instance of the fourth sequence; and generating the first dataset further comprises: detecting that a second instance of the fourth sequence in the time-ordered record is before a second instance of the third sequence in the time-ordered record; and updating a third element of the first dataset to indicate that the second instance of the fourth sequence is before the second instance of the third sequence.

7. The method of any of embodiments 5 to 6, wherein updating the second element further comprises: detecting that an instance of a fifth sequence in the time-ordered record is after the instance of the fourth sequence in the time-ordered record; and updating the second element based on the detection that the instance of the fifth sequence is after the instance of the fourth sequence in the time-ordered record.

8. The method of any of embodiments 1 to 7, wherein the decision model comprises a transformer neural network, and wherein providing the reduced dataset to the decision model comprises: generating a set of token vectors based on the reduced dataset; and providing the set of token vectors to the transformer neural network to determine the set of model results.

9. The method of any of embodiments 1 to 8, further comprising: obtaining a set of permitted sequences associated with a first user attribute, wherein the set of permitted sequences identifies the first sequence; and setting a first value of the first dataset to be equal to zero in response to detecting that the first user attribute is associated with the user.

10. The method of any of embodiments 1 to 9, further comprising: determining a count of the first sequence in the time-ordered record; and updating the time-ordered record based on the count of the first sequence.

11. The method of any of embodiments 1 to 10, wherein: the plurality of stored sequences of action types comprises a first stored sequence; the first stored sequence is stored in association with a duration threshold; and generating the first dataset comprises: detecting that a first portion of the time-ordered record matches with the first sequence; determining a dataset element of the first dataset based on a match between the first portion of the time-ordered record and the first sequence; detecting that a second portion of the time-ordered record matches with the first sequence; and updating the dataset element of the first dataset based on a match between the second portion of the time-ordered record and a detection that a duration between the first portion and the second portion satisfies the duration threshold.

12. The method of any of embodiments 1 to 11, the method further comprising: obtaining a plurality of sequence presence datasets, wherein a count of elements of the first dataset is equal to the count of elements of each respective dataset of the plurality of sequence presence datasets; and determining the sequence relations table based on the plurality of sequence presence datasets, wherein the sequence relations table indicates that the first sequence is correlated with the second sequence.

13. The method of embodiment 12, wherein the plurality of sequence presence datasets comprises the first dataset.

14. The method of any of embodiments 1 to 13, wherein the sequence relations table comprises a set of sequence relations scores comprising a first value indicating a correlation between the first sequence and the second sequence, the method further comprising indicating the first sequence is correlated with the second sequence based on a detection that the first value satisfies a relations threshold.

15. The method of any of embodiments 1 to 14, wherein the time-ordered set of action types is associated with a user, the method further comprising: obtaining an association indicating set of permitted sequences associated with a first user attribute; updating the reduced dataset element in response to detecting that the first user attribute is associated with the user.

16. The method of any of embodiments 1 to 15, the method further comprising: obtaining a plurality of time-ordered sets of action types comprising a first time-ordered set of action types and a second time-ordered set of action types, wherein each respective set of the plurality of time-ordered sets of action types is associated with a label indicating malicious activity; detecting that a shared action type sequence between the first and second time-ordered sets of action types; and selecting the shared action type sequence as the first sequence.

17. The method of any of embodiments 1 to 16, wherein the time-ordered set of action types is a first time-ordered set of action types, the method further comprising: obtaining a plurality of time-ordered sets of action types comprising a second time-ordered set of action types and a third time-ordered set of action types, wherein each respective set of the plurality of time-ordered sets of action types is associated with a label indicating malicious activity; detecting that a shared order of shared action type sequences between the first and second time-ordered sets of action types, wherein the shared action type sequence indicates that a third sequence is before a fourth sequence; detecting that a portion of the first time-ordered set of action types matches the shared order of shared action type sequences; and updating a second element of the first dataset to indicate a match between the portion of the first time-ordered set of action types and the shared order of shared action type sequences.

18. The method of any of embodiments 1 to 17, wherein generating the first dataset comprises: truncating the time-ordered set of action types based on a cutoff duration; and generating the first dataset based on the truncated time-ordered set of action types.

19. The method of any of embodiments 1 to 18, wherein the reduced dataset element is a first reduced dataset element, and wherein the time-ordered set of action types is a first time-ordered set of action types, and wherein the reduced dataset is a first reduced dataset, and wherein the plurality of stored sequences comprises a third sequence, the method further comprising: obtaining a second time-ordered set of action types associated with a second user; and generating a second dataset by determining, for each respective stored sequence of the plurality of stored sequences, a respective dataset element indicating that the respective stored sequence is present in the second time-ordered set of action types; generating a second reduced dataset based on the second dataset by (i) detecting that the second dataset indicates matches between a first portion of the second time-ordered set of action types and the first sequence and between a second portion of the second time-ordered set of action types and the third sequence and (2) determining a second reduced dataset element of the second reduced dataset based on the detection of the matches and a sequence relations score between the first and third sequences indicated by the sequence relations table, wherein the second reduced dataset element of the first reduced dataset and the second reduced dataset element of the second reduced dataset indicate a same feature type; providing the second reduced dataset to the decision model to obtain a second set of model results; and detecting malicious activity related to the second user based on the second set of model results.

20. The method of any of embodiments 1 to 19, wherein detecting malicious activity using the decision model comprises: obtaining a set of weights based on a category associated with the time-ordered set of action types; modifying values of the reduced dataset with the set of weights; and providing the modified values to the decision model.

21. One or more tangible, non-transitory, machine-readable media storing instructions that, when executed by a set of processors, cause the set of processors to effectuate operations comprising those of any of embodiments 1-20.

22. A system comprising: a set of processors and memory storing computer program instructions that, when executed by the set of processors, cause the set of processors to effectuate operations comprising those of any of embodiments 1-20.

What is claimed is:

1. A system for detecting malicious activity based on a reduced sequence vector, the system comprising one or more processors and one or more non-transitory, computer-readable media storing instructions that, when executed by the one or more processors, cause the one or more processors to:
    obtain a time-ordered set of action types ordered based on timestamps representing actions of a user;
    generate a sequence presence vector by determining, for each respective sequence of stored action type sequences, a respective vector element indicating whether the respective sequence is present in the time-ordered set of action types;
    generate a reduced vector based on the sequence presence vector and a correlation table indicating that a first sequence is correlated with a second sequence, wherein the reduced vector has fewer elements than the sequence presence vector, and wherein generating the reduced vector comprises,
    determining a reduced vector element of the reduced vector indicating a presence of at least one of the first sequence or the second sequence by (i) detecting a result indicating that the sequence presence vector indicates that the first sequence and the second sequence are present in the time-ordered set of action types and (ii) based on the result, associating the first sequence with the second sequence in response to detecting that a correlation threshold is satisfied by a correlation score between the first and second sequences indicated by the correlation table; and
    detect malicious activity related to the user based on the reduced vector comprising the reduced vector element.

2. The system of claim 1, wherein generating the reduced vector further comprises associating the first sequence with the second sequence in response to a detection that the correlation score is greater than the correlation threshold.

3. A method comprising:
    obtaining a time-ordered set of action types ordered based on timestamps;
    generating a first dataset based on a plurality of stored sequences by determining, for each respective stored sequence of the plurality of stored sequences, a respective dataset element indicating that the respective stored sequence is present in the time-ordered set of action types, wherein the plurality of stored sequences comprises a first sequence and a second sequence;
    generating a reduced dataset based on the first dataset and a sequence relations table by determining a reduced dataset element by (a) determining a result that the first dataset indicates that the first sequence and the second sequence are in the time-ordered set of action types and (b) based on the result, associating the first sequence with the second sequence in response to detecting that a threshold is satisfied by a sequence relations score between the first and second sequences indicated by the sequence relations table; and
    detecting malicious activity related to a user associated with the time-ordered set of action types based on the reduced dataset.

4. The method of claim 3, wherein generating the first dataset comprises:
   detecting that an instance of a third sequence in the time-ordered set of action types is before an instance of a fourth sequence in the time-ordered set of action types; and
   updating a second element of the first dataset to indicate that the third sequence is before the fourth sequence.

5. The method of claim 4, wherein:
   the instance of the third sequence is a first instance of the third sequence;
   the instance of the fourth sequence is a first instance of the fourth sequence; and
   generating the first dataset further comprises:
   detecting that a second instance of the fourth sequence in the time-ordered set of action types is before a second instance of the third sequence in the time-ordered set of action types; and
   updating a third element of the first dataset to indicate that the second instance of the fourth sequence is before the second instance of the third sequence.

6. The method of claim 4, wherein updating the second element further comprises:
   detecting that an instance of a fifth sequence in the time-ordered set of action types is after the instance of the fourth sequence in the time-ordered set of action type; and
   updating the second element based on the detection that the instance of the fifth sequence is after the instance of the fourth sequence in the time-ordered set of action types.

7. The method of claim 3, wherein detecting the malicious activity comprises:
   generating a set of token vectors based on the reduced dataset; and
   providing the set of token vectors to a transformer neural network to determine a set of model results; and
   detecting the malicious activity based on the set of model results.

8. The method of claim 3, further comprising:
   obtaining a set of permitted sequences associated with a first user attribute, wherein the set of permitted sequences identifies the first sequence; and
   setting a first value of the first dataset to be equal to zero in response to detecting that the first user attribute is associated with the user.

9. The method of claim 3, further comprising:
   determining a count of the first sequence in the time-ordered set of action types; and
   updating the time-ordered set of action types based on the count of the first sequence.

10. The method of claim 3, wherein:
    the plurality of stored sequences of action types comprises a first stored sequence;
    the first stored sequence is stored in association with a duration threshold; and
    generating the first dataset comprises:
    detecting that a first portion of the time-ordered set of action types matches with the first sequence;
    determining a dataset element of the first dataset based on a match between the first portion of the time-ordered set of action types and the first sequence;
    detecting that a second portion of the time-ordered set of action types matches with the first sequence; and
    updating the dataset element of the first dataset based on a match between the second portion of the time-ordered set of action types and a detection that a duration between the first portion and the second portion satisfies the duration threshold.

11. A set of non-transitory, computer-readable media storing instructions that, when executed by one or more processors, cause the one or more processors to perform operations comprising:
    obtaining a time-ordered set of action types;
    generating a first dataset by determining, for each respective stored sequence of a plurality of stored sequences, a respective dataset element indicating that the respective stored sequence is present in the time-ordered set of action types, wherein the plurality of stored sequences comprises a first sequence and a second sequence, wherein a sequence relations table comprises a set of scores comprising a first value indicating a correlation between the first sequence and the second sequence;
    indicating that the first sequence is correlated with the second sequence based on a detection that the first value satisfies a relations threshold;
    generating a reduced dataset based on the first dataset by (i) detecting that the first dataset indicates that the first sequence and the second sequence are present in the time-ordered set of action types and (ii) determining a reduced dataset element based on the detection of a presence of the first sequence and the second sequence in the time-ordered set of action types and a score between the first sequence and the second sequence indicated by a sequence relations table; and
    detecting malicious activity using a decision model based on the reduced dataset.

12. The set of non-transitory, computer-readable media of claim 11, the operations further comprising:
    obtaining a plurality of sequence presence datasets, wherein a count of elements of the first dataset is equal to the count of elements of each respective dataset of the plurality of sequence presence datasets; and
    determining the sequence relations table based on the plurality of sequence presence datasets, wherein the sequence relations table indicates that the first sequence is correlated with the second sequence.

13. The set of non-transitory, computer-readable media of claim 12, wherein the plurality of sequence presence datasets comprises the first dataset.

14. The set of non-transitory, computer-readable media of claim 11, wherein the time-ordered set of action types is associated with a user, the operations further comprising:
    obtaining an association indicating a set of permitted sequences associated with a first user attribute; and
    updating the reduced dataset element in response to detecting that the first user attribute is associated with the user.

15. The set of non-transitory, computer-readable media of claim 11, the operations further comprising:
    obtaining a plurality of time-ordered sets of action types comprising a first time-ordered set of action types and a second time-ordered set of action types, wherein each respective set of the plurality of time-ordered sets of action types is associated with a label indicating malicious activity;
    detecting a shared action type sequence between the first and second time-ordered sets of action types; and
    selecting the shared action type sequence as the first sequence.

16. The set of non-transitory, computer-readable media of claim 11, wherein the time-ordered set of action types is a first time-ordered set of action types, the operations further comprising:
- obtaining a plurality of time-ordered sets of action types comprising a second time-ordered set of action types and a third time-ordered set of action types, wherein each respective set of the plurality of time-ordered sets of action types is associated with a label indicating malicious activity;
- detecting a shared order of shared action type sequences between the first and second time-ordered sets of action types, wherein the shared order of shared action type sequence indicates that a third sequence is before a fourth sequence;
- detecting that a portion of the first time-ordered set of action types matches the shared order of shared action type sequences; and
- updating a second element of the first dataset to indicate a match between the portion of the first time-ordered set of action types and the shared order of shared action type sequences.

17. The set of non-transitory, computer-readable media of claim 11, wherein generating the first dataset comprises:
- truncating the time-ordered set of action types based on a cutoff duration; and
- generating the first dataset based on the truncated time-ordered set of action types.

18. The set of non-transitory, computer-readable media of claim 11, wherein the reduced dataset element is a first reduced dataset element, and wherein the time-ordered set of action types is a first time-ordered set of action types, and wherein the reduced dataset is a first reduced dataset, and wherein the plurality of stored sequences comprises a third sequence, the operations further comprising:
- obtaining a second time-ordered set of action types associated with a second user;
- generating a second dataset by determining, for each respective stored sequence of the plurality of stored sequences, a respective dataset element indicating that the respective stored sequence is present in the second time-ordered set of action types;
- generating a second reduced dataset based on the second dataset by (i) detecting that the second dataset indicates matches between a first portion of the second time-ordered set of action types and the first sequence and between a second portion of the second time-ordered set of action types and the third sequence and (ii) determining a second reduced dataset element of the second reduced dataset based on the detection of the matches and a score between the first and third sequences indicated by the sequence relations table, wherein the second reduced dataset element of the first reduced dataset and the second reduced dataset element of the second reduced dataset indicate a same feature type;
- providing the second reduced dataset to the decision model to obtain a second set of model results; and
- detecting malicious activity related to the second user based on the second set of model results.

19. The set of non-transitory, computer-readable media of claim 11, wherein detecting malicious activity using the decision model comprises:
- obtaining a set of weights based on a category associated with the time-ordered set of action types;
- modifying values of the reduced dataset with the set of weights; and
- providing the modified values to the decision model.

* * * * *